US012015893B2

(12) United States Patent
Li

(10) Patent No.: US 12,015,893 B2
(45) Date of Patent: Jun. 18, 2024

(54) STEREO SOUND BOX AND STEREO SOUND SYSTEM

(71) Applicant: TGI Technology PTE LTD, Singapore (SG)

(72) Inventor: Shihuang Li, Singapore (SG)

(73) Assignee: TGI TECHNOLOGY PTE LTD, Singapore (SG)

( * ) Notice: Subject to any disclaimer, the term of this patent is extended or adjusted under 35 U.S.C. 154(b) by 0 days.

(21) Appl. No.: 17/769,569

(22) PCT Filed: Oct. 11, 2020

(86) PCT No.: PCT/SG2020/050581
§ 371 (c)(1),
(2) Date: Jul. 22, 2022

(87) PCT Pub. No.: WO2021/076051
PCT Pub. Date: Apr. 22, 2021

(65) Prior Publication Data

US 2023/0171534 A1 Jun. 1, 2023

(30) Foreign Application Priority Data

Oct. 15, 2019 (CN) ........................ 201910977881.5

(51) Int. Cl.
*H04R 1/28* (2006.01)
*H04R 1/02* (2006.01)
(Continued)

(52) U.S. Cl.
CPC ........... *H04R 1/2819* (2013.01); *H04R 1/025* (2013.01); *H04R 1/24* (2013.01); *H04R 1/2826* (2013.01);
(Continued)

(58) Field of Classification Search
CPC ........ H04R 1/2819; H04R 1/025; H04R 1/24; H04R 1/2826; H04R 5/02; H04R 5/04; H04R 2420/07; H04S 1/007
See application file for complete search history.

(56) References Cited

U.S. PATENT DOCUMENTS 3,393,764 A * 7/1968 Schafer .................. H04R 1/227 381/89
3,720,787 A * 3/1973 Ishii ......................... H04R 1/02 381/345
(Continued)

FOREIGN PATENT DOCUMENTS

CN 101031164 A 9/2007
CN 201156812 Y 11/2008
(Continued)

*Primary Examiner* — Jason R Kurr
(74) *Attorney, Agent, or Firm* — Hayes Soloway PC

(57) ABSTRACT

Provided in the present invention is a stereo sound box, including: a box body. Two sets of sound generating units are provided on a surface of the box body, correspondingly for a left sound channel and a right sound channel. Each set of sound generating units includes a low sound unit and at least one high sound unit. The low sound units of the two sets of sound generating units are arranged to mirror each other so as to neutralize the inertia of vibrations. The high sound units are arranged outside each low sound unit. In the described stereo sound box, high-fidelity low sound can be maintained even while the box body is kept light.

7 Claims, 4 Drawing Sheets

(51) Int. Cl.

| | |
|---|---|
| ***H04R 1/24*** | (2006.01) |
| ***H04R 5/02*** | (2006.01) |
| ***H04R 5/04*** | (2006.01) |
| ***H04S 1/00*** | (2006.01) |

(52) U.S. Cl.

CPC ................. *H04R 5/02* (2013.01); *H04R 5/04* (2013.01); *H04S 1/007* (2013.01); *H04R 2420/07* (2013.01)

(56) References Cited

U.S. PATENT DOCUMENTS

| | | | | |
|---|---|---|---|---|
| 4,783,820 | A * | 11/1988 | Lyngdorf | H04R 1/227 381/89 |
| 4,805,221 | A * | 2/1989 | Quaas | H04R 1/2896 181/171 |
| 6,625,289 | B1 | 9/2003 | Oliemuller | |
| 7,796,775 | B2 * | 9/2010 | Oxford | H04R 1/26 381/345 |
| 2004/0017920 | A1 * | 1/2004 | Nishikawa | H04R 1/227 381/89 |
| 2017/0289492 | A1 | 10/2017 | Tian et al. | |
| 2017/0295424 | A1 * | 10/2017 | Yang | H04R 1/20 |
| 2017/0359653 | A1 * | 12/2017 | Barone | H04R 5/04 |

FOREIGN PATENT DOCUMENTS

| | | | |
|---|---|---|---|
| CN | 102196334 | A | 9/2011 |
| CN | 102655614 | A | 9/2012 |
| CN | 209358769 | U | 9/2019 |

* cited by examiner

STEREO SOUND BOX AND STEREO SOUND SYSTEM

CROSS-REFERENCE TO RELATED APPLICATIONS AND PRIORITY

This patent application claims priority from PCT Patent Application No. PCT/SG2020/050581 filed Oct. 11, 2020, which claims priority from Chinese Patent Application No. 201910977881.5 filed Oct. 15, 2019. Each of these patent applications are herein incorporated by reference in their entirety.

FIELD OF INVENTION

The present invention relates to a speaker, and in particular, to a stereo sound box.

DESCRIPTION OF RELATED ART

A conventional stereo sound system generally needs two independent sound boxes which are combined to form a left sound channel and a right sound channel. Therefore, the sound boxes occupy a relatively large volume and are not convenient enough to use. If two speaker units are integrated on one box body, the two speaker units have very large vibration inertia in use, resulting in very serious sound coloration, so that sound quality of the entire sound boxes is very poor. If two sound channels are designed in one sound box, in this design, a mid-low sound speaker and a high sound speaker are usually placed in the same direction. Considering directivity of high sound, the speakers face the front, so that it is difficult for the mid-low sound speaker to reach a mirror setting, and the inertia of vibrations of the low sound needs to be neutralized by a weight of the box body, making the weight of the sound box very large.

SUMMARY

A main problem to be solved by the present invention is to provide a stereo sound box, such that high-fidelity low sound can be maintained even while a box body is kept light.

To solve the foregoing technical problem, the present invention provides a stereo sound box, including a box body, wherein two sets of sound generating units are provided on a surface of the box body, correspondingly for a left sound channel and a right sound channel; each set of sound generating units includes a low sound unit and at least one high sound unit; and the low sound units of the two sets of sound generating units are arranged to mirror each other so as to neutralize inertia of vibrations; and the high sound units are arranged outside each low sound unit.

In a preferred embodiment, four high sound units are arranged outside each low sound unit; and the high sound units are arranged on an upper side, a lower side, a left side, and a right side of the low sound unit.

In a preferred embodiment, the stereo sound box further includes an inverted tube, wherein an open end of the inverted tube communicates with the surface of the box body, and faces a user.

In a preferred embodiment, the box body is an integrally formed pressure container.

In a preferred embodiment, magnets of the two low sound units are connected to each other through a connecting member, and when the two low sound units have a movement trend of approaching or moving away from each other, the connecting member provides a limiting force against a relative movement direction for the low sound units.

The present invention further provides a stereo sound system, including two sound boxes corresponding to a left sound channel and a right sound channel respectively, wherein the sound boxes each include a box body; two sets of sound generating units are provided on a surface of the box body; the sound generating units each include a low sound unit and at least one high sound unit; and the low sound units of the two sets of sound generating units are arranged to mirror each other so as to neutralize inertia of vibrations; and the high sound units are arranged outside each low sound unit.

In a preferred embodiment, four high sound units are arranged outside each low sound unit; and the high sound units are arranged on an upper side, a lower side, a left side, and a right side of the low sound unit.

In a preferred embodiment, the stereo sound system further includes an inverted tube, wherein an open end of the inverted tube communicates with the surface of the box body, and faces a user.

In a preferred embodiment, the two sound boxes are connected wirelessly to form a stereo sound system.

In a preferred embodiment, the box body is an integrally formed pressure container.

Compared with the prior art, the technical solution of present invention has the following beneficial effects:

1. In the stereo sound box provided in the present invention, two low sound units on a box body are arranged to mirror each other, so as to neutralize the inertia of vibrations generated by the two low sound units, and high-fidelity low sound can be maintained even while a sound box housing is kept light.
2. In the stereo sound box provided in the present invention, one high sound unit is arranged outside each low sound unit, so that the sound box has a balanced sound effect in the range of 180°. In addition, an inverted tube faces the front for output, so that the low sound effect is basically not affected by placement of the sound box.
3. In the stereo sound box provided in the present invention, two stereo sound boxes may be combined into a stereo sound system, so that two sets of sound generating units in each sound box are used as a left sound channel or a right sound channel simultaneously. Due to the symmetrical structure of the two sets of sound generating units, each sound box has the effect of being close to a point sound source when emitting a single-sound-channel audio, thereby implementing very good sound field restoration.
4. In the stereo sound box provided in the present invention, a plurality of high sound units may be arranged outside one low sound unit. This makes the sound box have a sound listening effect in a three-dimensional space (balanced sound effects are achieved on the upper, lower, left, right, and rear sides of the sound box).

DETAILED DESCRIPTION

The technical solutions of the present invention will be further described below with reference to the accompanying drawings and specific implementations.

Example 1

Figure 1:
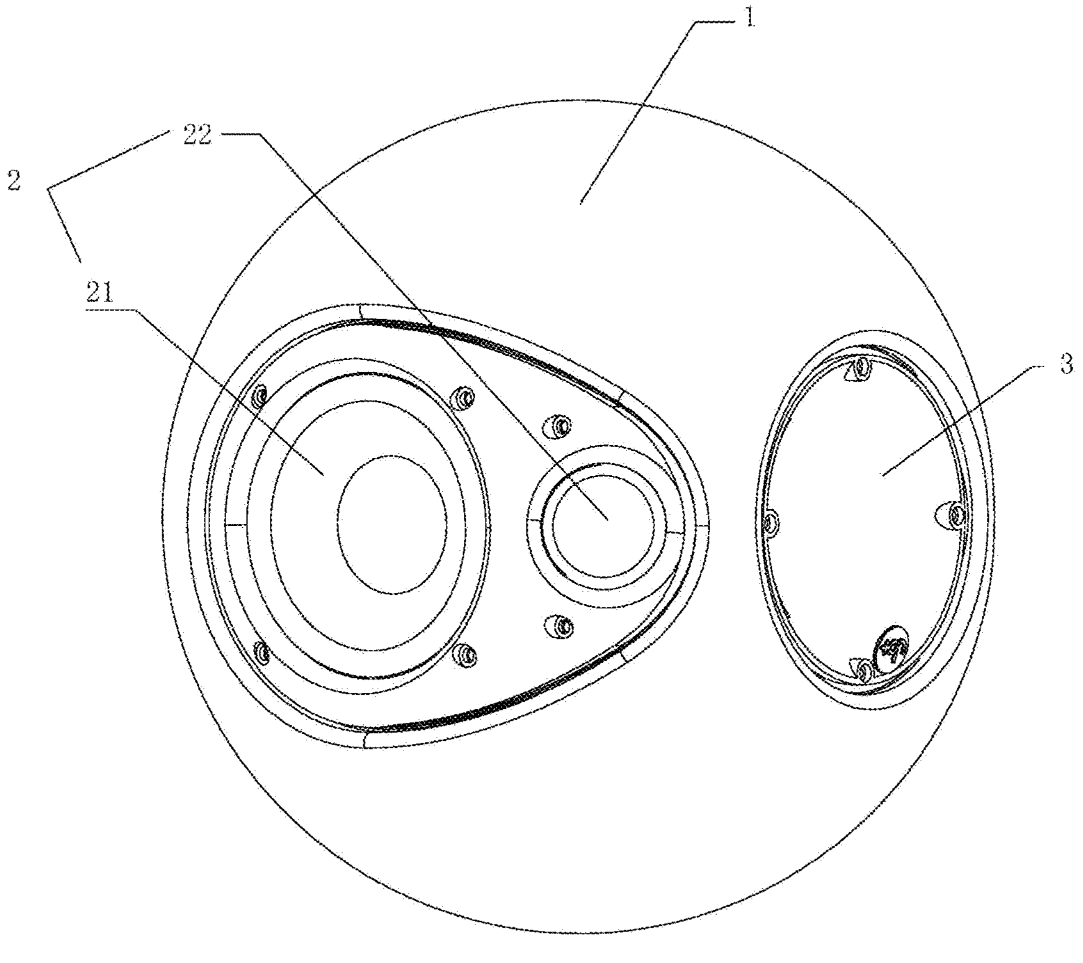
FIG. 1 is a perspective view of a sound box in preferred Embodiment 1 of the present invention.
Figure 2:
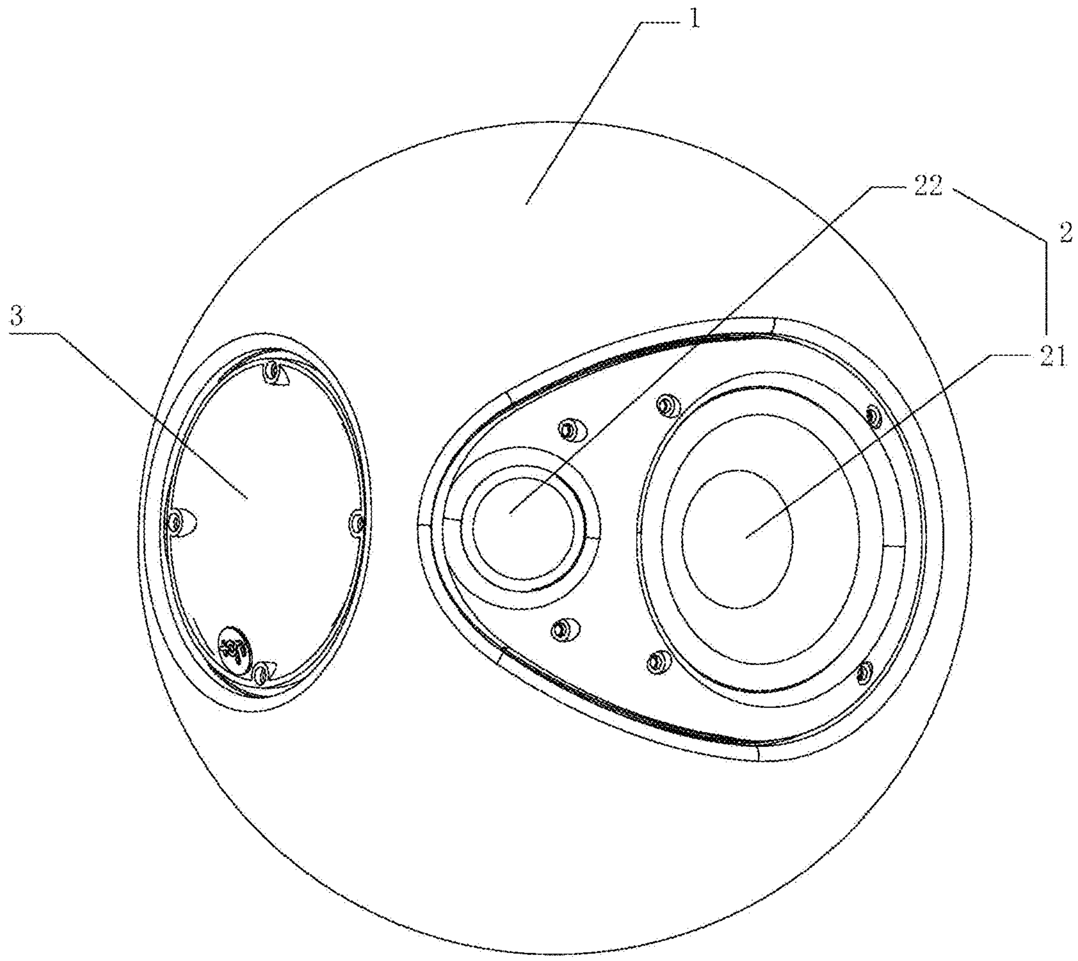
FIG. 2 is a view of a sound box in preferred Embodiment 1 of the present invention from another perspective.

Referring to FIGS. 1 and 2, the present invention provides a stereo sound box, including a box body 1, wherein two sets of sound generating units 2 are provided on a surface of the box body 1, correspondingly for a left sound channel and a right sound channel; each set of sound generating units 2 includes a low sound unit 21 and a high sound unit 22; and the low sound units 21 of the two sets of sound generating units 2 are arranged to mirror each other so as to neutralize inertia of vibrations; and the high sound units 22 are arranged outside each low sound unit 21.

In the foregoing stereo sound box, the two low sound units 21 on the box body are arranged to mirror each other, so as to neutralize the inertia of vibrations generated by the two low sound units 21, and high-fidelity low sound can be maintained even while a sound box housing is kept light. Therefore, the box body 1 in this example may be manufactured by the integral blow molding process. The box body 1 is in a shape of a pressure container, and is specifically spherical. This can improve deformation resistance of the box body 1.

In this example, the stereo sound box further includes an inverted tube 3, wherein an open end of the inverted tube 3 communicates with the surface of the box body 1, and faces a user.

In the foregoing stereo sound box, one high sound unit 22 is arranged outside each low sound unit 21, so that the sound box has a balanced sound effect in the range of 180°. In addition, the inverted tube faces the front for output, so that the low sound effect is basically not affected by placement of the sound box.

In this example, the user may wirelessly connect two stereo sound boxes to form a stereo sound system, so that two sets of sound generating units in each sound box are used as a left sound channel or a right sound channel simultaneously. Due to the symmetrical structure of the two sets of sound generating units 2, each sound box has the effect of being close to a point sound source when emitting a single-sound-channel audio, thereby implementing very good sound field restoration.

In this example, magnets of the two low sound units 21 are connected to each other through a connecting member, and when the two low sound units 21 have a movement trend of approaching or moving away from each other, the connecting member provides a limiting force against a relative movement direction for the low sound units 21. This can completely eliminate the inertia of vibrations of the two low sound units 21, and further improve sound quality of the sound box.

Example 2

This example differs from Example 1 in that, two high sound units 22 are arranged outside each low sound unit 21; and the high sound units 22 are arranged on a left side and a right side of the low sound unit 21. This makes the sound box have a sound listening effect at 360° in a horizontal direction (balanced sound effects are achieved on the left, right, front, and rear of the sound box).

Example 3

Figure 3:
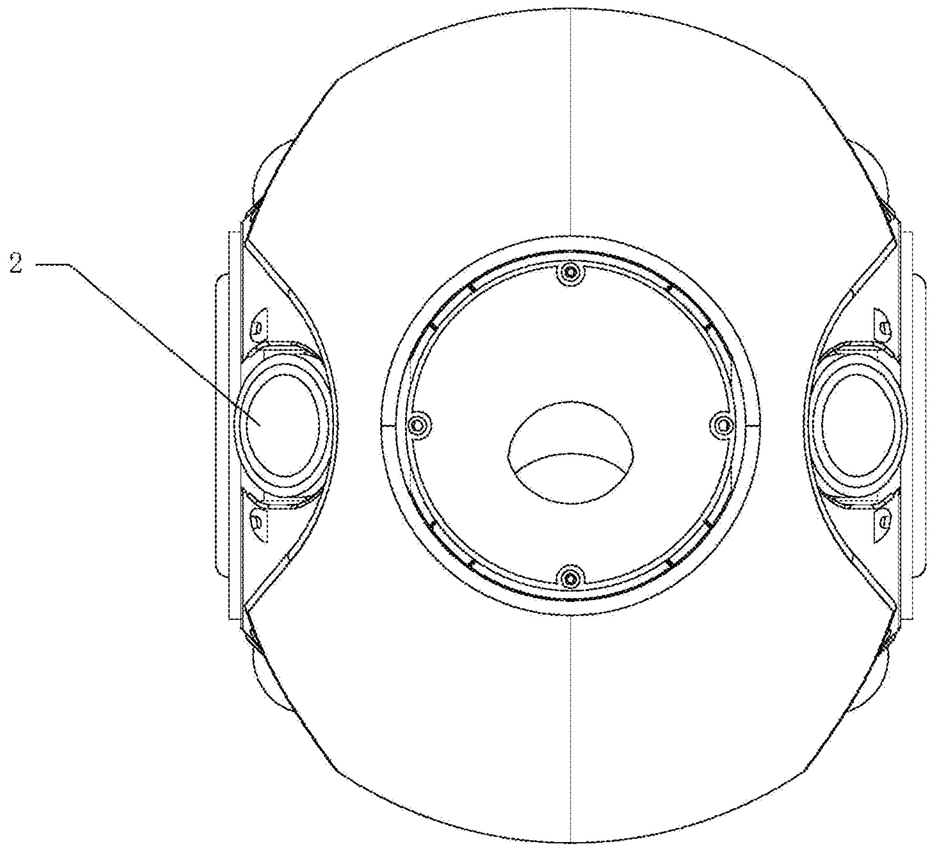
FIG. 3 is a perspective view of a sound box in preferred Embodiment 3 of the present invention.
Figure 4:
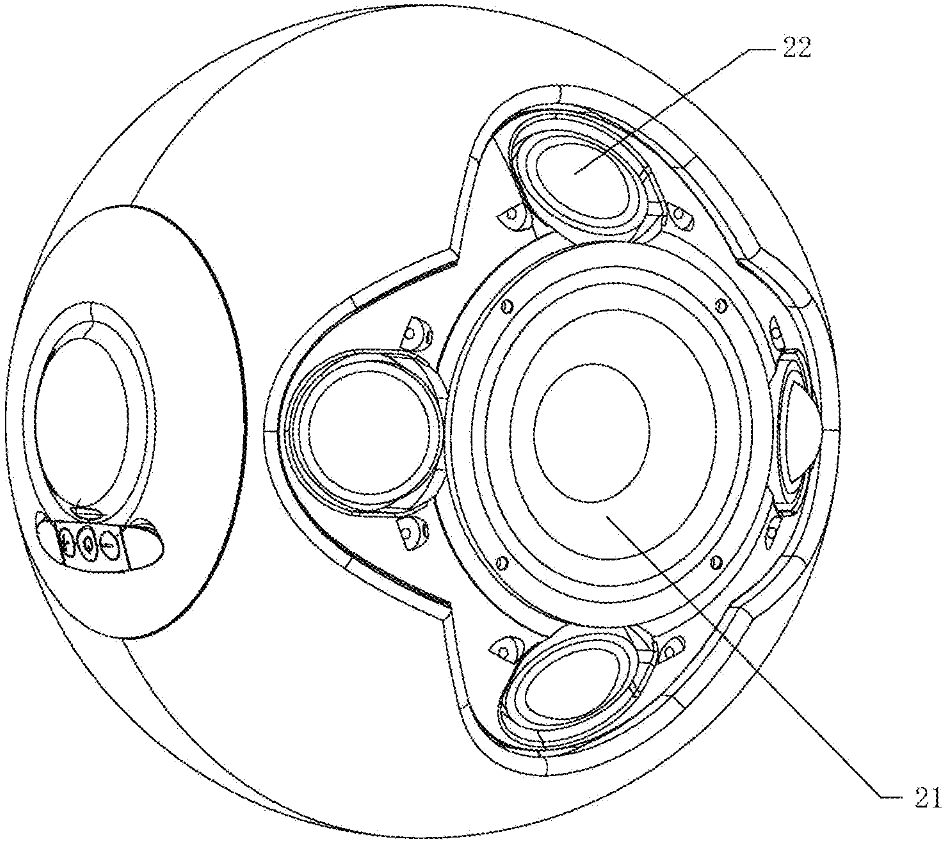
FIG. 4 is a view of a sound box in preferred Embodiment 3 of the present invention from another perspective.

Referring to FIGS. 3 and 4, this example differs from Example 1 in that, four high sound units 22 are arranged outside each low sound unit 21; and the high sound units 22 are arranged on an upper side, a lower left side, and a right side of the low sound unit 21. This makes the sound box have a sound listening effect in a three-dimensional space (balanced sound effects are achieved on the upper, lower, left, right, and rear sides of the sound box).

The foregoing descriptions are only preferred implementation examples of the present invention, and the implementation scope of the present invention should not be limited accordingly. That is, equivalent changes and modifications made according to the claims and the contents of the specification of the present invention should still fall within the scope of the present invention.

What is claimed is:

1. A stereo sound box, comprising:

a blow molded, spherical box body, two sets of sound generating units provided on a surface of the blow molded, spherical box body, correspondingly for a left sound channel and a right sound channel; each set of sound generating units comprises a low sound unit and at least one high sound unit; and the low sound units of the two sets of sound generating units are arranged to mirror each other thereby neutralizing inertia of vibrations; and the high sound units are arranged outside each low sound unit.

2. The stereo sound box of claim 1, wherein four high sound units are arranged outside each low sound unit; and the high sound units are arranged on an upper side, a lower side, a left side, and a right side of the low sound unit.

3. The stereo sound box of claim 2, further comprising an inverted tube, wherein an open end of the inverted tube communicates with the surface of the blow molded, spherical box body, and faces a user.

4. The stereo sound box of claim 1, further comprising an inverted tube, wherein an open end of the inverted tube communicates with the surface of the blow molded, spherical box body, and faces a user.

5. The stereo sound box of claim 4, wherein the inverted tube extends in a non-perpendicular angled direction from the surface of the box body.

6. The stereo sound box of claim 1, wherein the blow molded, spherical box body is an integrally formed pressure container.

7. The stereo sound box of claim 1, wherein magnets of the two low sound units are connected to each other through a connecting member, and when the two low sound units have a movement trend of approaching or moving away from each other, the connecting member provides a limiting force against a relative movement direction for the low sound units.

* * * * *